(12) United States Patent
Garfinkel

(10) Patent No.: US 6,678,270 B1
(45) Date of Patent: Jan. 13, 2004

(54) PACKET INTERCEPTION SYSTEM INCLUDING ARRANGEMENT FACILITATING AUTHENTICATION OF INTERCEPTED PACKETS

(75) Inventor: Simson L. Garfinkel, Cambridge, MA (US)

(73) Assignee: Sandstorm Enterprises, Inc., Boston, MA (US)

( * ) Notice: Subject to any disclaimer, the term of this patent is extended or adjusted under 35 U.S.C. 154(b) by 0 days.

(21) Appl. No.: 09/267,449

(22) Filed: Mar. 12, 1999

(51) Int. Cl.[7] .............................................. H04L 12/28
(52) U.S. Cl. .................. 370/392; 370/395.32; 713/153
(58) Field of Search ................................. 370/252, 394, 370/389, 401, 410, 349, 355, 356, 392, 395.32, 428, 488, 471, 497; 380/277, 2; 382/124; 713/153

(56) References Cited

U.S. PATENT DOCUMENTS

| | | | | |
|---|---|---|---|---|
| 5,548,646 A | * | 8/1996 | Aziz et al. | 380/23 |
| 6,122,372 A | * | 9/2000 | Hughes | 380/2 |
| 6,229,806 B1 | * | 5/2001 | Lockhart et al. | 370/389 |

* cited by examiner

Primary Examiner—Chi Pham
Assistant Examiner—Alexander O. Boakye
(74) Attorney, Agent, or Firm—Stuart D. Rudoler; Wolf, Block, Schorr and Solis-Cohen LLP

(57) ABSTRACT

A packet interception system intercepts message packets transmitted from a packet source or to a packet destination, and processes them so as to facilitate verification of the contents and the sequence with which the message packets are intercepted, and for storing the processed message packets for later use. The packet interception system generates for each intercepted message packets respective hash values based on the respective intercepted message packet and the hash value generated for the previously-intercepted message packet, or, for the first intercepted message packet, a value that is provided to identify the session. To verify a previously-stored intercepted message packet, the packet interception system, or another device, using the same hash algorithm, can process the sequence of stored intercepted message packets up to and including the intercepted message packet to be verified, to and compare the hash value generated to the previously-generated hash value for each of the message packets. If the sequence of hash values so generated corresponds to the previously-stored sequence, both the integrity and the sequence of message packets is verified. In addition to the hash values, the packet interception system can, for selected ones of the intercepted message packets, generate digital signatures using any convenient encryption algorithm.

10 Claims, 4 Drawing Sheets

FIG. 2

PACKET INTERCEPTION SYSTEM INCLUDING ARRANGEMENT FACILITATING AUTHENTICATION OF INTERCEPTED PACKETS

FIELD OF THE INVENTION

The invention relates generally to the field of systems and methods for intercepting communications and more particularly to systems and methods for facilitating packet authentication.

BACKGROUND OF THE INVENTION

Wiretapping, including interception and recording of communications, can be quite useful in investigations by governmental agencies such as law enforcement, as well as and private investigative agencies. Although originally developed to intercept analog telephonic communications, more recently agencies have discovered that wiretapping can also be useful to intercept digital message packets transmitted by a computer or other packet source device, or received by another computer or other packet destination device, over, for example, a digital data network such as the Internet, World Wide Web.

A problem arises in connection with wiretapping of digital message packets which does not arise as readily in connection with wiretapping of analog communications. With wiretapping of analog communications, it is very difficult to tamper with a recording in an undetectable manner. That is, if someone tampers with a recording of analog communications, at least some tampering is likely to be detected, which can, in turn, put into question the veracity of all of the recordings developed during a wiretap. On the other hand, with digital data, the data can be easily tampered with, and the tampering is difficult to detect. The message packets can be encrypted using, for example, a public encryption key/private decryption key mechanism. In such an arrangement, the recording device which performs the wiretap can, after receiving a message packet, encrypt the message packet using the public encryption key. The private decryption key which can decrypt the encrypted message packets is only available to, for example, people who will be making use of the message packets, as evidence in, for example, a trial in court. If the encrypted message packet is tampered with, the tampering is likely to be relatively easily detectable. It is unlikely that an encrypted message packet that has been tampered with would decrypt to a comprehensible message. In addition, if, as is common, the message packet originally had an error detection code, when a tampered-with encrypted message packet is decrypted, it is highly likely that the error correction code would indicate that the message packet, after decryption, is erroneous.

While the message packets can be encrypted and decrypted as described above to preserve the integrity of message packets recorded during wiretapping, several problems arise. First, encryption of a message packet can require relatively significant amount of time. Accordingly, if the rate at which message packets are being received becomes relatively high, the encryption apparatus can easily become overwhelmed. In addition, although the order in which message packets are received by the wiretap apparatus can be important, the encryption of the separate message packets will not assist in verifying the order in which they are received. A time stamp can be applied to each message packet reflecting the time at which the message packet is received, either before or after encryption, but the time stamps can be applied in an erroneous manner.

SUMMARY OF THE INVENTION

The invention provides a new and improved packet interception system for intercepting packets transmitted from, for example, a particular packet source or to a particular packet destination, the packet interception system including an arrangement for facilitating authentication of intercepted packets.

In brief summary, the invention in one aspect provides a packet interception system for intercepting message packets transmitted from a packet source or to a packet destination, for processing them in such a manner as to facilitate verification of the contents and the sequence with which the message packets are intercepted, and for storing the processed message packets for later use. The packet interception system generates for each intercepted message packets respective hash values, using any convenient hash algorithm, based on the respective intercepted message packet and the hash value generated for the previously-intercepted message packet, or, for the first intercepted message packet, a value that is provided to identify the session.

To verify a previously-stored intercepted message packet, the packet interception system, or another device, using the same hash algorithm, can process the sequence of stored intercepted message packets up to and including the intercepted message packet to be verified, to and compare the hash value generated to the previously-generated hash value for each of the message packets. If the sequence of hash values so generated corresponds to the previously-stored sequence, both the integrity and the sequence of message packets is verified.

In addition to the hash values, the packet interception system can, for selected ones of the intercepted message packets, generate digital signatures using any convenient encryption algorithm. In one embodiment, the encryption algorithm is selected to be a public verification key/private signature key algorithm. The private signing key is provided only to the packet interception system to facilitate digital signing of the intercepted message packets. The public verification key is provided to the packet verification system or other instrumentality that is to verify and use the intercepted packets. Since only the public verification key is available to the packet verification system, the digital signature can be verified thereby but not forged.

Since the packet interception system makes use of a hash algorithm to generate a hash value, instead of an encryption algorithm to generate encrypted message packets or a digital signature for each message packet, it will readily able to process message packets as they are intercepted in generally real time.

In another aspect, the invention provides an intercept system monitor that monitors status and establish predetermined conditions in said packet intercept system 10 over a wireless link.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 2 depicts a data structure useful in understanding the operation of the packet interception system depicted in FIG. 1 in connection with facilitating authentication of intercepted message packets.

DETAILED DESCRIPTION OF AN ILLUSTRATIVE EMBODIMENT

Figure 1:
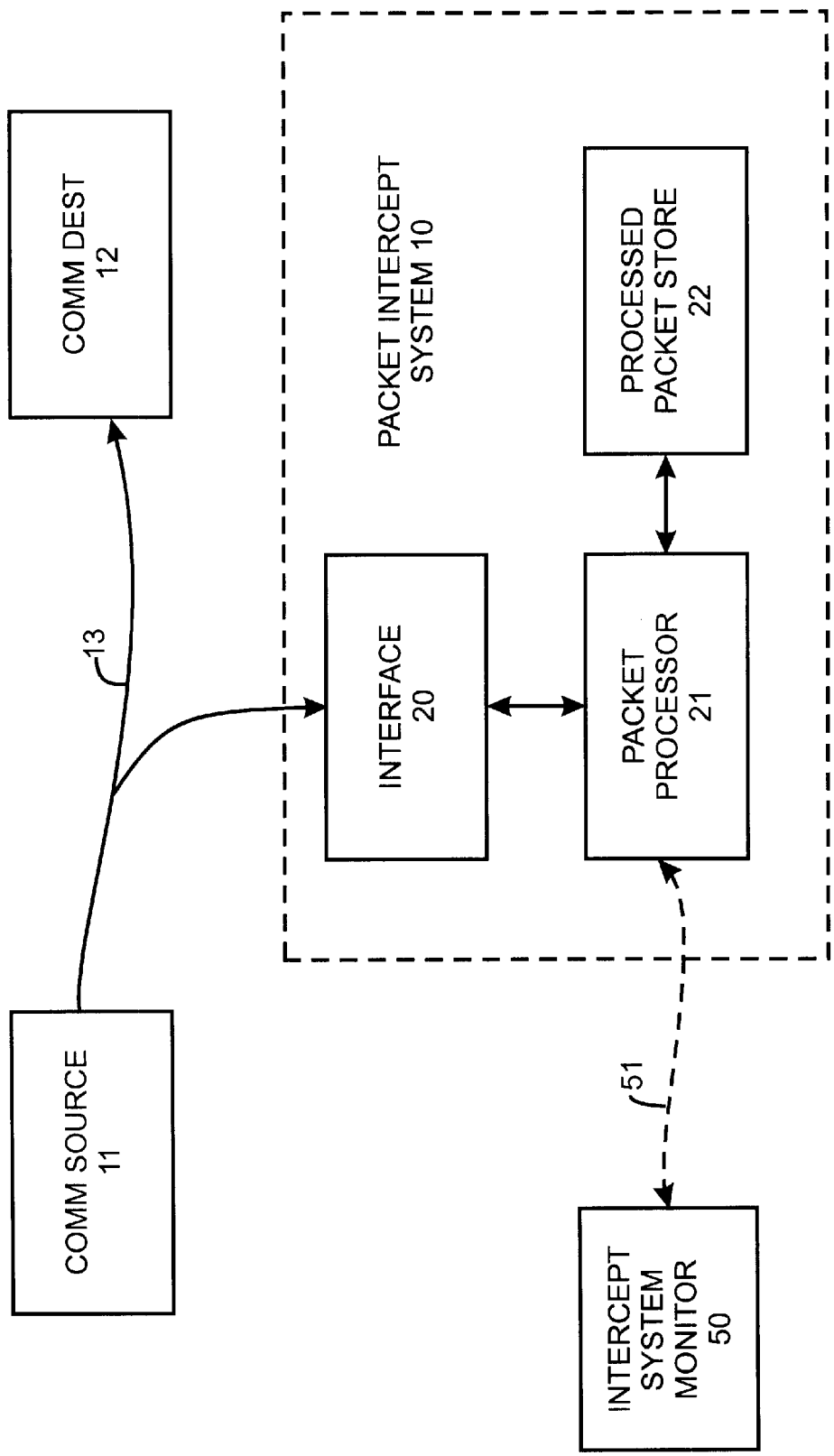
FIG. 1 is a functional block diagram of a packet interception system including an arrangement for facilitating authentication of intercepted message packets, constructed in accordance with the invention.

FIG. 1 is a functional block diagram of a packet interception system 10 including an arrangement for facilitating authentication of intercepted message packets constructed in accordance with the invention. With reference to FIG. 1, the packet interception system 10 is used in connection with interception of message packets transmitted from a packet source 11 to one or more packet destinations (one packet destination, identified by reference numeral 12 is depicted in FIG. 1) over a communications medium 13. The packet source 11 may comprise any mechanism for generating and transmitting packets over a communications medium, including, for example, a personal computer, computer workstation or the like. Similarly, the packet destination 12 may comprise any mechanism for receiving packets and utilizing and/or storing packets, including, for example, a personal computer, computer workstation, a mass information storage subsystem, hardcopy output device, or the like. The communications medium 13 may comprise any of a number of types of media for transferring packets between the packet source 11, including, for example, a public digital data network such as the Internet or World Wide Web, a private network, the public switched telephone network (PSTN), or any other mechanism by which digital data can be transferred from the packet source 11 to the packet destination 12.

The packet interception system 10 operates as a wiretap mechanism to eavesdrop on the message packets transmitted by the packet source 11 over communications medium 13 and intercept and store copies of the message packets. The mechanism by which the packet interception system 10 intercepts copies of the message packets from the communications medium is well-known and will not be described herein. After receiving a message packet, the packet interception system 10, appends a time stamp that identifies the time at which the packet was intercepted, and in addition provides a tag that facilitates authentication of both the information in the packet and the sequence with which packets are received to a high degree of reliability. The packet interception system 10 includes an interface 20, a packet processor 21 and a processed packet store 22. The interface 20 receives copies of the packets from the communications medium 13 and provides them to the packet processor 21 for processing. The interface 20 may include any suitable network interface through which the packet interception system 10 can receive message packets. In addition, the interface 20 may also provide connections to other types of equipment, including, for example, personal computers, computer workstations or the like over which the packet interception system 10 can provide information as described below. The packet processor 21, which may be in the form of a conventional microprocessor with suitable programming, appends the time stamp and the tag to the message packet to generate a processed packet, and stores the processed packet in the processed packet store 22. The structure of processed packets and their organization as stored in the processed packet store 22 will be described below in connection with FIG. 2. Operations performed by the packet processor 21 in connection with generating the tag appended to the processed packets will be described below in connection with FIG. 3.

After the packet processor 21 has stored the processed packets in the processed packet store 22, they (that is, the processed packets) can be retrieved under control of an operator for review or other use. The time stamp provided by the packet processor 21 identifies the time at which the packet processor 21 processed the packet. Thus, the time stamps appended to successively-received packets can allow a reviewer reviewing the processed packets to identify the sequence of packets transmitted by the packet source 11. The tag appended to the packet in each processed packet facilitates authentication of the contents of the packet, as well as the time stamp. In addition, the manner in which the tags for successive processed packets are generated are further serves to authenticate the packet sequence. The processed packets, or any portion thereof, can be retrieved from the processed packet store 22 by the packet processor 21 and provided to the interface 20, which, in turn, can provide them to the operator for use thereby in, for example, examining the intercepted message packets.

Figure 2:
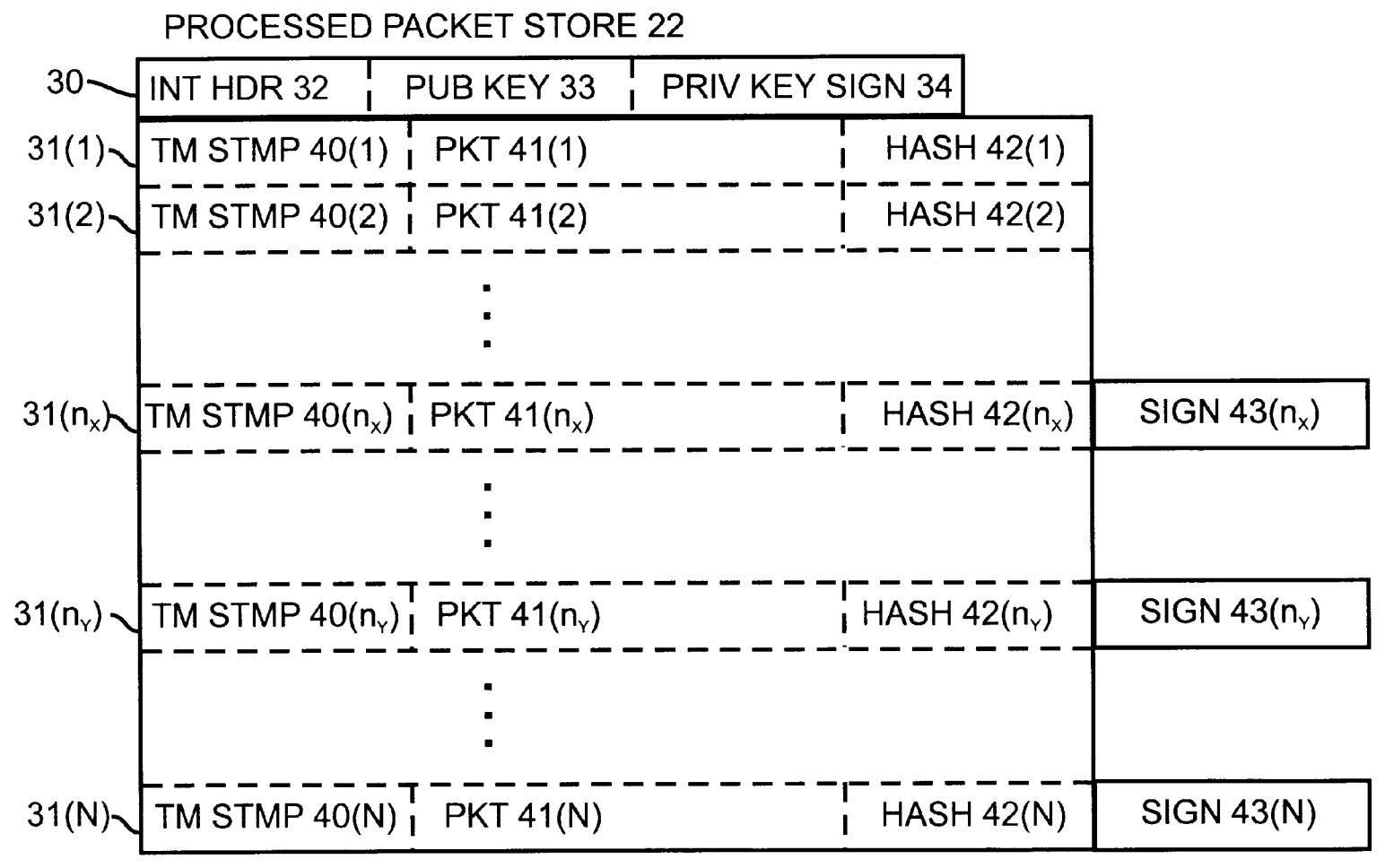

FIG. 2 depicts a data structure representing processed packets as stored in the processed packet store 22. The processed packet store 22 can comprise any of a number of types of digital data storage devices, including semiconductor memory devices, disk or tape storage arrangements, and the like, or any combination thereof. With reference to FIG. 2, the processed packet store 22 includes a header 30 and a plurality of processed packet entries 31(1) through 31(N) (generally identified by reference numeral 31(n)). The header 30 includes identifying information stored in a plurality of fields, including an intercept header field 32, a public key field 33 and a private key signature field 34. The intercept header field 32 includes information such as, for example, the identification of the packet interception system 10 and an intercept session identifier. What constitutes a intercept session can be determined by any convenient measurement standard, including, for example, a predetermined maximum time period, the time required to fill a storage devices or the like. The public key field 33 includes the public encryption key which is by the packet interception system 10 in encrypting information as will be described below. The public key is the public portion of a public encryption key/private decryption key pair, and the private key signature field 34 contains the signature for the private decryption key portion of the pair. The private key signature in field 34 can be used to identify the private decryption key which can be used to decrypt encrypted information in the processed packet store 22.

Each processed packet entry 31(n) includes three fields, namely, a time stamp field 40(n), a packet field 41(n) and a hash code field 42(n). In addition, some of the entries include signature fields 43(n). The packet field 41(n) contains the information contained in a packet that was intercepted by the packet interception system 10. The time stamp field 40(n) includes the time stamp identifying the time at which the packet was intercepted and processed by the packet processor 21. The hash field 42(n) in each entry 31(n) contains a hash value, which is generated using any selected hash function as the hash of the hash value in the field 42(n−1) of the preceding entry 31(n−1) and the information contained in the time stamp field 40(n) and packet field 41(n) of the respective entry 31(n). For the first entry 31(1), instead of using a hash value in a preceding entry, the hash value in hash field 42(1) is generated as the hash of the information in the header 30 an the information contained in the time stamp field 40(1) and packet field 41(1) of the entry 31(1). Since a hash function is used for the entries 31(n), the packets can be processed much more quickly than if digital signatures were generated for the information contained in each of the entries 31(n). In addition, depending on the hash function that is selected for use in generating the hash values, the authenticity of the information in the time stamp and packet fields 40(n) and 41(n) of an entry 31(n) can be ensured to a relatively high degree of reliability. Further, since the hash value generated for each entry 31(n) depends on a portion of the information contained in the previous entry 31(n−1), or, in the case of the first entry 31(1), the header 30, the sequencing of the entries 31(1), . . . ,31(n), 31(n+1), 31(N) can be verified with a relatively high degree of reliability.

As noted above, some of the entries 31(n), specifically, entries 31($n_x$), 31($n_y$), . . . 31(N) are provided with respective signature fields 43($n_x$), 43($n_y$), . . . 43(N). The signature fields are provided for digital signatures, which the packet processor 21 generates for the respective entries using the information in the respective entries 31($n_x$), 31($n_y$), . . . 31(N) and the public encryption key in field 33. The digital signatures can be used to provide further verification of the authenticity of the information in those respective entries 31($n_x$), 31($n_y$), . . . 31(N). Preferably, the number of entries 31(n) with which digital signatures are used will be a relatively small percentage of the total number of entries 31(n) in the processed packet store. Since typically the packet processor 21 will be able to generate a hash code for use in fields 42(n), considerably faster would be required to encrypt the contents of an entry 31(n) or to generate a digital signature therefor, by using a hash code for each entry 31(n) and limiting the number of entries 31(n) for which digital signatures are generated, the packet interception system 10 will be able to process message packets received on a real-time basis even if the rate at which message packets are received is relatively high.

As noted above, the hash values in fields 42(n) of the entries 31(n) allow authentication of the information contained in the time stamp and packet fields 40(n) and 41(n) of the respective entries 31(n), and also authentication of the sequence of entries 31(1), . . . 31(n), 31(n+1), . . . 31(N). This will be clear from the fact that if the hash algorithm is applied to the successive entries 31(1), . . . 31(n), 31(n+1), . . . 31(N), in the same manner as when the hash values are generated to generate a respective second hash values, if each respective second hash value corresponds to the hash value in the respective field 42(n), the information in the fields 40(n) and 41(n) of the entries is authentic, and the sequence of entries 31(l), . . . 31(n), 31(n+1), 31(N) is the correct sequence.

Figure 3A:
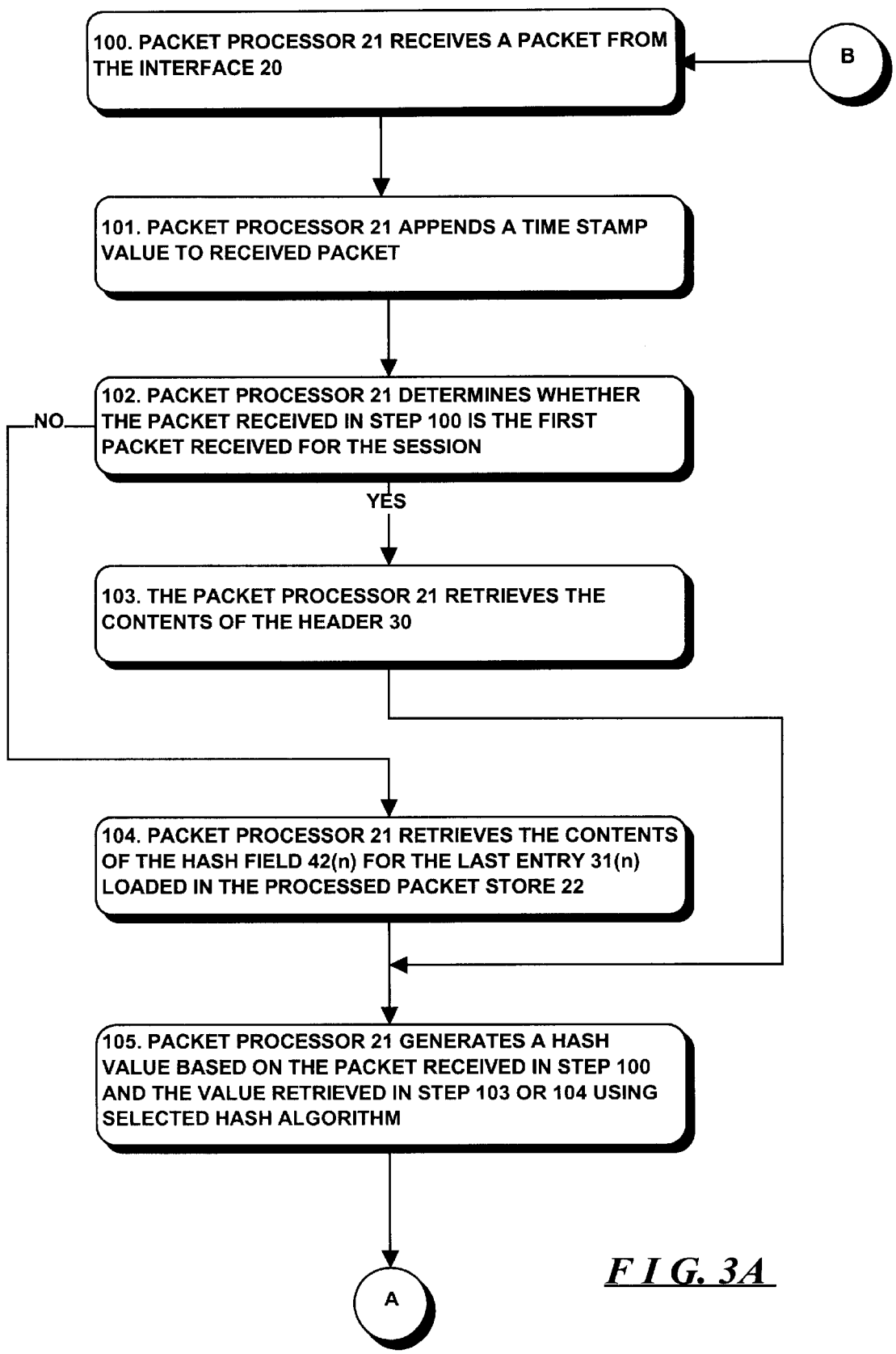
FIG. 3 is a flowchart depicting operations performed by the packet interception system in connection with generating information to facilitate authentication of intercepted message packets.
Figure 3B:
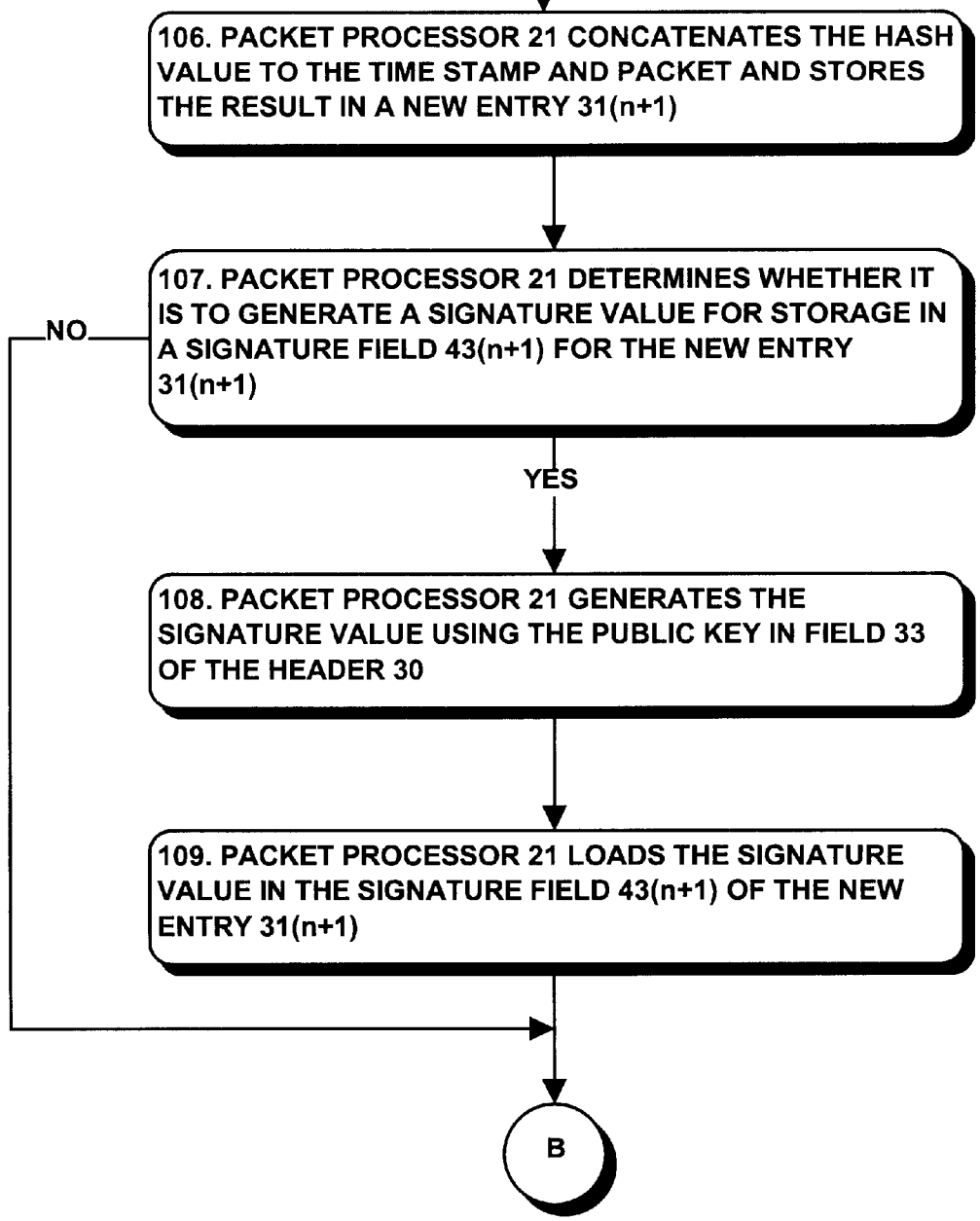

FIG. 3 is a flowchart depicting operations performed by the packet processor 21 in processing a packet that it receives from the interface 20 for storage in a new entry. With reference to FIG. 3, after the packet processor 21 receives a packet from the interface 20 (step 100), it appends a time stamp value thereto (step 101). If the packet received in step 100 is the first received for the session. (step 102), the packet processor 21 retrieves the contents of the header 30 (step 103). On the other hand, if the packet received in step 100 is not the first received for the session, the packet processor 21 retrieves the contents of the hash field 42(n) for the last entry 31(n) loaded in the processed packet store 22 (step 104). Following either step 103 (if the packet received in step 100 is the first packet received during the session) or step 104 (if the packet received in step 100 is not the first packet received during the session), the packet processor 21 generates a hash value based on the packet received in step 100 and the value retrieved in step 103 or 104 (step 105) and concatenates the hash value to the time stamp and packet and stores the result in the new entry 31(n+1) (step 106). If the processor 21 is to generate a signature value for storage in a signature field 43(n+1) for the entry (step 107) it generates the signature value using the public key in field 33 of the header 30 (step 108) and loads the signature value in the field 43(n+1). Following step 108, or step 107 if the packet processor is not to generate a signature value for the entry 31(n+1), the packet processor 21 returns to step 100 to receive the next packet.

As noted above, the packet processor 21 can also authenticate both the contents and the sequence of one or more of the processed packets which have been stored in the processed packet store 22. In that operation, the packet processor performs operations similar to those described above in connection with generation of the hash codes for the series of entries 31(1), 31(2), . . . up to the respective entry 31(n) whose message packet in field 41(n) is to be verified. If the hash codes in the series of entries correspond to the hash codes so generated, then both the contents and the sequence of message packets in the series of entries 31(1), 31(2), . . . 31(n) will be verified.

The invention provides a number of advantages. In particular, the invention provides a mechanism whereby both the contents and sequence of message packets which have been intercepted in a wiretapping or eavesdropping operation can be authenticated. Since processing in connection with a hash function is typically much faster than processing in connection with a for most a hash function is used instead of a.

It will be appreciated that numerous modifications may be made to the packet interception system 10 described above in connection with FIGS. 1 through 3. Although the packet interception system 10 has been described in connection with eavesdropping and interception of message packets transmitted by a packet source 11 to one or more packet destinations, it will be appreciated that the packet interception system 10 can also be used in connection with eavesdropping and interception of message packets that are transmitted to a single packet destination 12 by more than one packet sources.

Although the packet processor 21 has been described as authenticating the contents and sequence of the processed packets which have been stored in the processed packet store 22, it will be appreciated that the authentication can be performed by another device (not shown) which performs operations similar to those described above. If the processed packets are stored on removable media such as floppy disk or tape devices, the removable media can be removed and used in connection with a disk or tape drive connected in, for example, a personal computer or computer workstation. If the processed packets are not stored on removable media, they may be retrieved by the packet processor 21 and provided to the interface 20. The interface 20, in turn, can transfer the processed packets provided by the packet processor 21 through a connection (not shown) to, for example, a personal computer or computer workstation for processing as described above.

A further modification will be described in connection with FIG. 1. With reference to FIG. 1, the packet intercept system 10 is associated with an intercept system monitor 50 for monitoring the status of the packet intercept system. The intercept system monitor 50 can monitor predetermined conditions of the packet intercept system 10, including, for example, the amount of memory left for storing intercepted and processed message packets in the processed packet store 22, the number of intercepted packets, and the like. In addition, the intercept system monitor 50 can establish and control conditions used by the packet intercept system 10, including, for example, providing values for the intercept header 32, public key 33 and the private key signature 34. The intercept system monitor 30 connects with the packet processor 21 over a wireless communication link represented by arrow 51.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by letters patent of the united states is:

1. A packet verification system for verifying message packets intercepted over a network, the packet verification system comprising:

A. a processed packet store configured to store a header and a series of processed message packets each processed message packet including a message packet and a hash value; and B. a packet verification processor configured to, in verification of a selected one of said processed message packets in said series, process successive processed message packets prior thereto in the series, for each processed message packet, as a current processed message packet, the packet verification processor being configured to process the message packet of the current processed message packet and a hash value associated with a hash value associated with a previous processed message packet in the series in connection with a selected hash algorithm thereby to generate a hash value for the message packet, compare the generated hash value to the hash value associated with the current processed message packet and determine whether the message packet is verified based on the comparison.

2. A packet verification system as defined in claim 1 which one of said current processed message packet is a first intercepted message packet, the verification packet processor being configured to use a selected value along with the first processed message packet in generating the processed message packet therefor.

3. A packet verification system as defined in claim 2 in which the selected value includes a session identifier value.

4. A packet verification system as defined in claim 1 in which said verification packet processor is further configured to process, in connection with each current processed message packet, a time stamp reflective of a time at which the current processed message packet was received, in connection with the hash algorithm.

5. A packet verification system as defined in claim 1 in which said selected ones of said processed message packets further have respective digital signatures, the verification processor further being configured to verify the digital signature associated with each processed message packet to be processed thereby.

6. A packet verification method for verifying message packets intercepted over a network and stored in a processed packet store configured to store a header and a series of processed message packets each processed message packet including a message packet and a hash value verification of a selected one of said processed message packets in said series, the method comprising the steps of iteratively, up to the selected one of said processed message packets:

A. process, for a current one of said processed message packets, the message packet of the current processed message packet and a hash value associated with a hash value associated with a previous processed message packet in the series in connection with a selected hash algorithm to generate a hash value for the message packet;

B. compare the generated hash value to the hash value associated with the current processed message packet; and C. determine whether the message packet is verified based on the comparison.

7. A packet verification method as defined in claim 6 in which one of said current processed message packet is a first intercepted message packet, the processor processing step including the step of using a selected value along with the first processed message packet in generating the processed message packet therefor.

8. A packet verification method as defined in claim 7 in which the selected value includes a session identifier value.

9. A packet verification method as defined in claim 6 in which said processing step includes the step of processing, in connection with each current processed message packet, a time stamp reflective of a time at which the current processed message packet was received, in connection with the hash algorithm.

10. A packet verification method as defined in claim 6 in which said selected ones of said processed message packets further have respective digital signatures, the processing step further including the step of verifying the digital signature associated with each processed message packet to be processed thereby.

* * * * *